United States Patent
Yefet et al.

(10) Patent No.: US 12,316,555 B2
(45) Date of Patent: *May 27, 2025

(54) MULTI-CHANNEL CONNECTION MANAGEMENT IN A NETWORK ADAPTER

(71) Applicant: MELLANOX TECHNOLOGIES, LTD., Yokneam (IL)

(72) Inventors: Gal Yefet, Haifa (IL); Daniel Marcovitch, Yokneam Illit (IL); Roee Moyal, Yokneam Illit (IL); Ariel Shahar, Jerusalem (IL); Gil Bloch, Zichron Yaakov (IL); Lior Narkis, Petah-Tikva (IL)

(73) Assignee: Mellanox Technologies, Ltd., Yokneam (IL)

( * ) Notice: Subject to any disclaimer, the term of this patent is extended or adjusted under 35 U.S.C. 154(b) by 361 days.

This patent is subject to a terminal disclaimer.

(21) Appl. No.: 17/899,652

(22) Filed: Aug. 31, 2022

(65) Prior Publication Data

US 2022/0407824 A1 Dec. 22, 2022

Related U.S. Application Data

(63) Continuation-in-part of application No. 17/142,366, filed on Jan. 6, 2021, now Pat. No. 11,451,493.

(51) Int. Cl.
*H04L 41/0604* (2022.01)
*H04L 49/9005* (2022.01)
*H04L 49/901* (2022.01)

(52) U.S. Cl.
CPC ...... *H04L 49/9005* (2013.01); *H04L 41/0604* (2013.01); *H04L 49/901* (2013.01)

(58) Field of Classification Search
CPC  H04L 49/9005; H04L 41/0604; H04L 49/901
See application file for complete search history.

(56) References Cited

U.S. PATENT DOCUMENTS 5,887,134 A     3/1999   Ebrahim
5,970,069 A * 10/1999   Kumar ................... H04L 69/12
                                                                                                                              370/402

(Continued)

OTHER PUBLICATIONS

Infiniband Trade Association, "InfiniBand™ Architecture Specification", vol. 1, Release 1.3, pp. 1-1842, Mar. 3, 2015.

(Continued)

*Primary Examiner* — Abdelnabi O Musa
(74) *Attorney, Agent, or Firm* — Meitar Patents Ltd.; Daniel Kligler

(57) ABSTRACT

A network adapter includes a network interface, a host interface and processing circuitry. The network interface connects to a communication network for communicating with remote targets. The host interface connects to a host that accesses a Multi-Channel Send Queue (MCSQ) storing Work Requests (WRs) originating from client processes running on the host. The processing circuitry is configured to retrieve WRs from the MCSQ and distribute the WRs among multiple Send Queues (SQs) accessible by the processing circuitry, and retrieve WRs from the multiple NSQs and execute data transmission operations specified in the WRs retrieved from the multiple NSQs.

32 Claims, 4 Drawing Sheets

(56) References Cited

U.S. PATENT DOCUMENTS

| | | | |
|---|---|---|---|
| 8,213,315 B2* | 7/2012 | Crupnicoff | H04L 67/14 370/395.2 |
| 8,761,189 B2* | 6/2014 | Shachar | H04L 47/10 370/463 |
| 8,811,417 B2* | 8/2014 | Bloch | G06F 9/546 710/48 |
| 10,305,772 B2* | 5/2019 | Zur | H04L 43/16 |
| 10,623,521 B2* | 4/2020 | Shuler | H04L 67/60 |
| 11,451,493 B2 | 9/2022 | Yefet et al. | |
| 2011/0116512 A1* | 5/2011 | Crupnicoff | H04L 67/14 370/463 |
| 2014/0003441 A1* | 1/2014 | Shachar | H04L 5/0055 370/400 |
| 2014/0310369 A1 | 10/2014 | Makhervaks | |
| 2015/0269116 A1* | 9/2015 | Raikin | B01J 37/0215 709/212 |
| 2016/0065659 A1* | 3/2016 | Bloch | G06F 9/546 709/201 |
| 2017/0346742 A1* | 11/2017 | Shahar | H04L 1/1635 |
| 2020/0259759 A1 | 8/2020 | Shalev | |

OTHER PUBLICATIONS

EP Application # 22150387.3 Office Action dated Nov. 3, 2023.
EP Application No. 22150387.3 Office Action dated Jan. 22, 2025.

* cited by examiner

MULTI-CHANNEL CONNECTION MANAGEMENT IN A NETWORK ADAPTER

CROSS-REFERENCE TO RELATED APPLICATIONS

This application is a continuation in part (CIP) of U.S. patent application Ser. No. 17/142,366, filed Jan. 6, 2021, which is incorporated herein by reference.

TECHNICAL FIELD

Embodiments described herein relate generally to data communication, and particularly to methods and systems for connection management in a network adapter.

BACKGROUND

InfiniBand™ (IB) is a switched-fabric communications architecture primarily used in high-performance computing. It has been standardized by the InfiniBand Trade Association. Computing devices (host processors and peripherals) connect to the IB fabric via a network adapter such as a Network Interface Controller (NIC). IB defines both a layered hardware protocol (physical, link, network, and transport layers) and a software layer, which manages initialization and communication between devices. The transport layer is responsible for in-order packet delivery, partitioning, channel multiplexing and transport services, as well as data segmentation when sending and reassembly when receiving.

Methods for communication using Reliable Connection (RC) and Dynamically Connected (DC) transport services are known in the art. For example, U.S. Pat. No. 8,213,315 describes a method of communication that includes receiving, in a network interface device, first and second requests from an initiator process running on an initiator host to transmit, respectively, first and second data to first and second target processes running on one or more target nodes, via a packet network. A single dynamically connected initiator context is allocated for serving both the first and second requests. A first connect packet referencing the dynamically connected (DC) initiator context is directed to the first target process so as to open a first dynamic connection with the first target process, followed by transmission of the first data over the first dynamic connection. The first dynamic connection is closed after the transmission of the first data, and a second connect packet is transmitted so as to open a second dynamic connection with the second target process, followed by transmission of the second data.

U.S. Pat. No. 8,761,189 describes a method for communication that includes allocating, in a network interface controller (NIC) a single dynamically connected (DC) initiator context for serving requests from an initiator process running on the initiator host to transmit data to multiple target processes running on one or more target nodes. The NIC transmits a first connect packet directed to a first target process and referencing the DC initiator context so as to open a first dynamic connection with the first target process. The NIC receives over the packet network, in response to the first connect packet, a first acknowledgment packet containing a first session identifier (ID). Following receipt of the first acknowledgment packet, the NIC transmits one or more first data packets containing the first session ID over the first dynamic connection from the NIC to the first target process. Dynamic connections with other target processes may subsequently be handled in similar fashion.

SUMMARY

An embodiment that is describe herein provides a network adapter that includes a network interface, a host interface and processing circuitry. The network interface is configured to connect to a communication network for communicating with remote targets. The host interface is configured to connect to a host that accesses a Multi-Channel Send Queue (MCSQ) storing Work Requests (WRs) originating from client processes running on the host. The processing circuitry is configured to retrieve WRs from the MCSQ and distribute the retrieved WRs among multiple Network Send Queues (NSQs) accessible by the processing circuitry, and retrieve WRs from the multiple NSQs and execute data transmission operations specified in the WRs retrieved from the multiple NSQs.

In some embodiments, each of the targets includes (i) a remote node coupled to the communication network or (ii) a local device coupled to the host. In other embodiments, the WRs comprise respective identifiers associated with respective NSQs, and the processing circuitry is configured to distribute the WRs among the NSQs based on the identifiers. In yet other embodiments, the processing circuitry is configured to, in response to detecting that the identifier in a retrieved WR has no associated NSQ among the NSQs, select an available NSQ among the multiple NSQs, to associate the identifier with the available NSQ, and to post the WR on the available NSQ.

In an embodiment, the processing circuitry is configured to, in response to detecting that the identifier in a given WR is associated with a selected NSQ, post the WR on the selected NSQ. In another embodiment, the processing circuitry is configured to operate the NSQs in accordance with a Reliable-Connection (RC) protocol in which the NSQs are assigned to connect persistently to respective targets. In yet another embodiment, the processing circuitry is configured to operate the NSQs in accordance with a Dynamically Connected (DC) protocol, which allows a given NSQ to connect to different targets at different times.

In some embodiments, the host posts WRs on a first and second MCSQs associated respectively with first and second pools of NSQs, and the processing circuitry is configured to distribute WRs from the first MCSQ to NSQs in the first pool, and to distribute WRs from the second MCSQ to NSQs of the second pool. In other embodiments, at least one NSQ is shared among the first and second pools, and the processing circuitry is configured to post WRs from both the first and the second MCSQs to the at least one NSQ. In yet other embodiments, the processing circuitry is configured to post on a (Completion Queue) CQ accessible by the client processes a Completion Queue Element (CQE) indicative of concluding execution of a given WR, after posting on the CQ all CQEs corresponding to WRs posted to the MCSQ before the given WR.

Optionally, the processing circuitry is further configured to post a Completion Queue Element (CQE) to a reorder buffer upon concluding execution of each WR, and to move at least some of the CQEs to a Completion Queue (CQ) accessible by the client processes, in an order in which the corresponding WRs were posted to the MCSQ. In some embodiments, in moving the at least some of the CQEs to the CQ accessible by the client processes, the processing circuitry combines a plurality of CQEs into a single CQE.

In an embodiment, the processing circuitry is configured to post CQEs to a CQ independently of an order of respective WRs in the MCSQ. In another embodiment, the processing circuitry is configured to distribute to a given NSQ that has established a connection with a given target, only WRs specifying the given target, until the connection terminates. In yet another embodiment, the processing circuitry is configured to, in response to detecting a failure in a given NSQ, post on a CQ a CQE indicative of the failure.

In some embodiments, the processing circuitry is configured to post on the CQ a CQE indicative of the failure for each WR that is to be executed in the given NSQ. In other embodiments, the processing circuitry is configured to post on the CQ a CQE indicative of the failure for each WR from the MCSQ that is to be distributed to the given SQ. In yet other embodiments, at least a given WR specifies a respective data transmission operation from the host to a target. In yet further other embodiments, at least a given WR specifies a locally executed operation.

Optionally, the processing circuitry distributes the retrieved WRs among the multiple NSQs by placing pointers to the WRs in the NSQs, without moving the WRs themselves. Optionally, the processing circuitry retrieves WRs from a plurality of different MCSQs, which each corresponds to a respective pool of NSQs, and distributes the retrieved WRs among the respective pool of NSQs. Optionally, at least one of the NSQs is shared by a plurality of pools of respective MCSQs. Optionally, the plurality of different MCSQs include different MCSQs for each client process.

Optionally, at least some of the WRs comprise both stream identifiers and channel identifiers associated with respective NSQs, and wherein the processing circuitry is configured to distribute the WRs of a specific stream among the NSQs based on the channel identifiers, in a manner which preserves the order of the packets in the stream. Optionally, in distributing WRs of a specific stream among the NSQs, the processing circuitry buffers WRs directed to an NSQ different than an NSQ to which a previous WR of the specific stream was transferred, until feedback is received that the previous WR was handled.

There is additionally provided, in accordance with an embodiment that is described herein, a method for communication, including, in a network adapter that connects to a communication network for communicating with remote targets, and further connects to a host that accesses a MCSQ storing Work Requests (WRs) originating from client processes running on the host, retrieving WRs from the MCSQ and distributing the retrieved WRs among multiple Send Queues (SQs) accessible by the processing circuitry.

There is additionally provided, in accordance with an embodiment that is described herein, a computing system, comprising a memory, which stores one or more multi-channel send queues (MCSQs) of work requests (WRs), a central processing unit (CPU) which places WRs on the one or more MCSQs, wherein each WR includes a respective stream ID, and a network adapter, which manages communication over a network in multiple channels, in accordance with WRs from one or more MCSQs, and ensures that WRs having a same stream ID are transmitted through a same network send queue (NSQ).

Optionally, the memory includes one or more completion queues (CQs) and the CPU is configured to receive through the CQs indications of a failed connection, and to refrain from placing WRs for the NSQ of the failed connection in the one or more MCSQs. Optionally, the CPU is configured to verify that failure indications were received for all the WRs placed on the one or more MCSQs with stream IDs directed to the NSQ of the failed connection, and to restart the NSQ of the failed connection only after the verification. Optionally, the network adapter distributes the WRs from the one or more MCSQs to network send queues (NSQs) responsive to the stream IDs.

There is additionally provided, in accordance with an embodiment that is described herein, a network adapter, comprising a network interface, configured to connect to a communication network for communicating with remote targets, a host interface configured to connect to a host that accesses a Multi-Channel Send Queue (MCSQ) storing Work Requests (WRs) originating from client processes running on the host; and processing circuitry, configured to retrieve WRs from the MCSQ and execute data transmission operations specified in the WRs retrieved, generate completion queue elements (CQEs) indicating execution of the WRs, in an order in which the WRs are executed, which is different from an order in which the WRs are placed in the MCSQ; and provide the CQEs to the host, in a completion queue (CQ) accessible by the host through the host interface, in the order in which the WRs are placed in the MCSQ. Optionally, the processing circuitry places the CQEs in the CQ, in accordance to the location of a corresponding WR in the MCSQ, when they are generated, but updates a producer index of the CQ only when all the locations between a current value of the producer index and an updated value of the producer index have been filled by CQEs. Optionally, the processing circuitry places the CQEs in a reorder buffer when they are generated and thereafter transfers the CQEs from the reorder buffer to the CQ, in the order in which the WRs are placed in the MCSQ.

These and other embodiments will be more fully understood from the following detailed description of the embodiments thereof, taken together with the drawings in which:

DETAILED DESCRIPTION OF EMBODIMENTS

Overview

Figure 1:
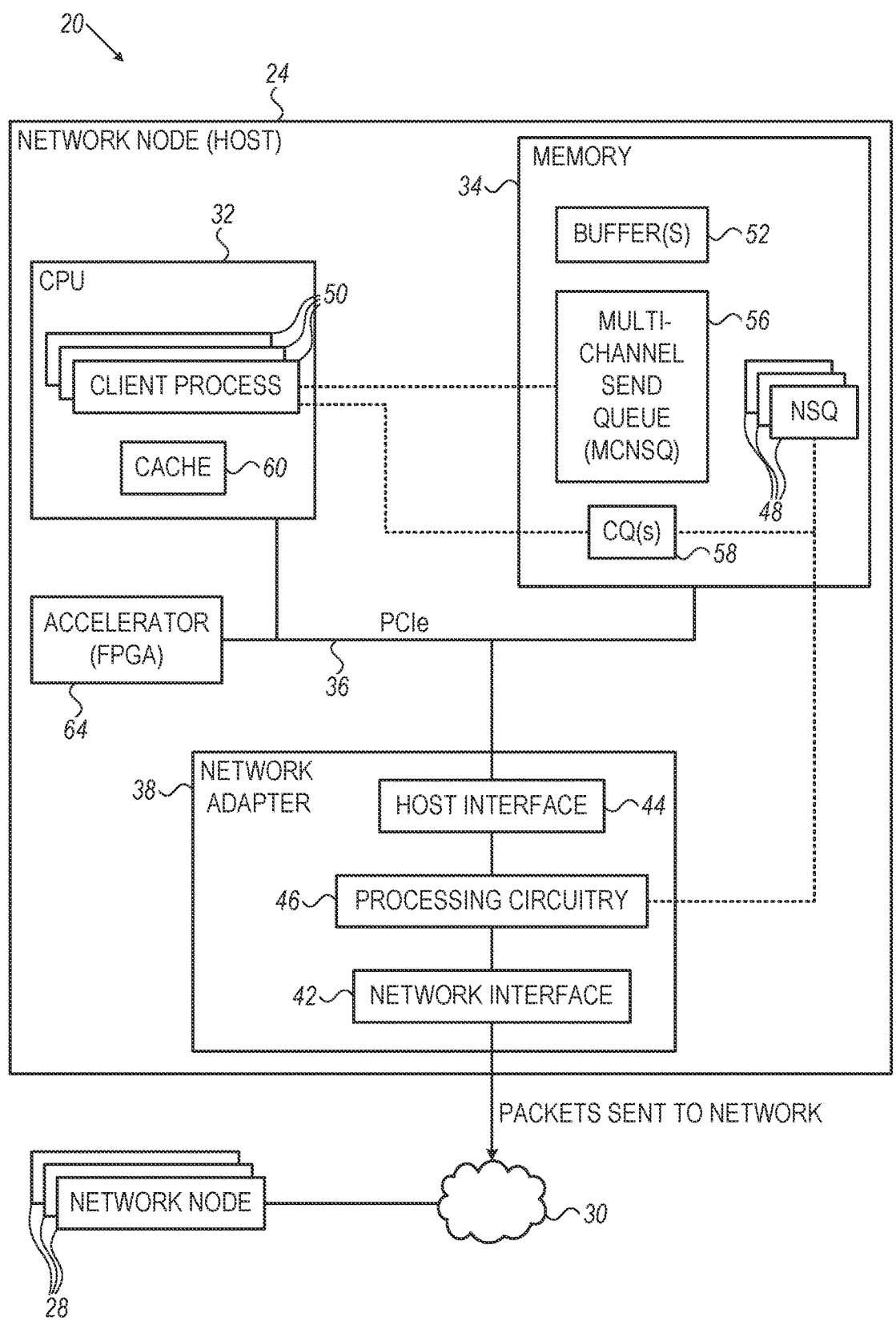
FIG. 1 is a block diagram that schematically illustrates a computing system, in which a network adapter manages for a host communication over multiple channels, in accordance with an embodiment that is described herein.

Embodiments that are described herein provide methods and systems for offloading communication management over multiple channels to a network adapter.

In various applications such as datacenters and High-Performance Computing (HPC), a host runs client processes that communicate with a large number of targets. The host is typically coupled to a network adapter for communicating with remote nodes over a packet network. The network adapter typically executes Work Requests (WRs) from the host, which instruct the network adapter on communication tasks to be performed. The WRs are posted by the host on one or more work queues from which the WRs are collected by the network adapter. The network adapter optionally manages a context for each work queue. The context is used in handling transmission WRs in the queue over a specific channel.

A work queue used for data transmission is referred to as a Send Queue (SQ), whereas a wok queue used for data reception is referred to as a Receive Queue (RQ). The WRs specify data transfer operations required, e.g., by client processes running on the host. The network adapter notifies the completion of a WR by posting a Completion Queue Element (CQE) on a Completion Queue (CQ) accessible by the host.

In some cases it is desired to coordinate transmissions on multiple channels such that the relative timing between the transmissions follow a desired pattern, forming a single stream. The single stream may include several channels directed to different respective destinations. Alternatively, the multiple channels may be directed to the same destination. In some embodiments, multiple streams may be directed to a same destination.

In principle, the host could handle multi-channel communication using a software program running on a Central Processing Unit (CPU) of the host. Such a software program that manages multiple SQs may comprise, for example, a program or a combination of multiple programs such as client processes, a communication stack and a driver that mediates between the host and network adapter. A software program of this sort repeatedly checks which WRs have completed and posts other outstanding WRs in a desired order. Although the disclosure below refers mainly to a host implemented using a CPU, the disclosed embodiments are similarly applicable using any other suitable processing unit implementing the host, such as, for example, a Graphics Processing Unit (GPU).

Managing multiple SQs in software may be disadvantageous for various reasons. For one, the software program may consume CPU cycles in executing tasks such as balancing workload among the multiple SQs and polling CQs. These CPU cycles could be otherwise used for executing non-communication operations, e.g., computation operations. The software program also typically consumes considerable bandwidth for communication between the host and network adapter, e.g., over the underlying bus, e.g., a Peripheral Component Interconnect Express (PCIe) bus. Moreover, managing a large number of SQs in software requires considerable storage space, and may result in poor caching performance of a cache of the host CPU.

The description that follows refers mainly to transport services and protocols referred to as Reliable Connection (RC) and Dynamically Connected (DC). Other suitable transport services or protocols such as the Transmission Control Protocol (TCP) are also applicable.

In the RC protocol, the connections are persistent and occupy respective SQs for long time periods. The RC protocol is therefore suitable for applications that require low to medium scalability. Unlike the persistence nature of RC, SQs configured to the DC protocol are used on demand, and are disconnected when a data transfer operation is done. A given DC SQ may thus connect to different targets at different times and change the context it uses accordingly.

In executing a WR specifying a data transmission operation, the network adapter typically transmits the data in multiple packets, wherein for each transmitted packet, the network adapter receives an Acknowledgement (Ack) notification from the target. In the DC protocol, a connection is disconnected and becomes available for connecting to another target only after receiving an Ack for the last packet of the current data transfer. In some embodiments, the network adapter utilizes the time gap between transmitting the last packet and disconnection, by handling communication via one or more other connections using other DC SQs. As one example, the CPU may apply hash-based scheduling, in which case WRs are posted on DC SQs by applying a suitable static hash function, e.g., to the target address specified in the WR. Hashed-based scheduling may, however, result in imbalanced workload among the DC SQs. As another example, the CPU may post WRs associated with a common flow on the same DC SQ. If no DC SQ is available, the CPU waits until some DC SQ is freed. In this scheme the software operates in async progress mode, which imposes burden on the CPU.

In some of the disclosed embodiments, the network adapter offloads the host software from the burden of managing multiple channels. To this end, the functionality of the send queues (SQs) is split between consumer SQs and network SQs as is now explained. The host software program posts WRs of multiple channels, such as destined to multiple targets, on a common consumer SQ, also referred to herein as a Multi-Channel SEND Queue (MCSQ). The network adapter retrieves WRs from the MCSQ and distributes them among network SQs (NSQs) corresponding to relevant channels. Specifically, when a channel is already assigned to a specific NSQ, that NSQ will be used. Otherwise, the network adapter allocates a new connection context, connects to the remote peer using the context, and sends the data to the remote peer over the established connection.

In some embodiments, an NSQ is assigned to each channel. In other embodiments, multiple channels use the same NSQ at different times. Optionally, a channel is defined herein as a group of packets directed to a specific destination, in accordance with a single set of transport rules, and in a manner which allows control of the order of the packets in the group. Generally, packets of a channel carry an ID which identifies the channel. Accordingly, each NSQ carries packets of a corresponding channel ID.

The network adapter also posts CQEs to a common CQ that is accessible by the host software program. In some embodiments, each NSQ has a corresponding internal CQ that is not accessible by the host software programs and each MCSQ has a corresponding common CQ, which is accessible by the host software programs. After handling a WR from an NSQ, the network adapter posts a CQE in the internal CQ corresponding to the NSQ from which the WR was retrieved. In addition, the network adapter transfers CQEs from the internal CQs to the appropriate common CQ. Alternatively, internal CQs are not used and the CQEs are placed temporarily in a reorder buffer and from the reorder buffer are transferred to the common CQ. In other embodiments, the CQEs are placed directly in the common CQ corresponding to the MCSQ from which the WR was retrieved. In one such embodiment, each CQE is placed in its intended location in the common CQ, according to an ID of the corresponding WR. If previous WRs were not completed yet, the placement of the CQEs leaves empty spaces for CQEs of those previous WRs, and a producer index (PI) of the common CQ is incremented only when placement of a CQE fills all the spaces from the previous location pointed at by the PI.

In some embodiments, instead of storing WRs in a queue, the NSQ has a small storage space for referencing WRs in the MCSQ, e.g., pointers to the WRs. Therefore, the NSQs handled by the network adapter require much less storage space than NSQs or SQs having full queues as typically handled in software.

Next, we focus on embodiments that relate mainly to the network adapter. Consider a network adapter comprising a network interface, a host interface and processing circuitry. The network interface connects to a communication network for communicating with remote targets. The host interface connects to a host that accesses a MCSQ storing WRs originating from client processes running on the host, wherein at least a given WR specifies a respective data transmission operation from the host to a target. Alternatively or additionally, at least a given WR specifies an operation locally executed by the network adapter, e.g., a memory registration operation. The processing circuitry retrieves WRs from the MCSQ and distributes the retrieved WRs among multiple NSQs accessible by the processing circuitry. In the present context, the operation of distributing a WR to a NSQ means that information for accessing that WR in the MCSQ is provided for storage in the NSQ. A WR whose accessing information is thus distributed and stored for the NSQ is referred to herein as a WR posted on the NSQ. The processing circuitry schedules execution of the WRs posted on the multiple NSQs, and posts CQEs on a CQ accessible by the client processes, wherein each CQE is indicative of concluding execution of one or more WRs.

Each of the targets with which the host communicates may comprise (i) a remote node coupled to the communication network or (ii) a local device coupled to the host, such as a hardware accelerator.

For distributing the WRs from the MCSQ to the NSQs, the WRs optionally comprise respective identifiers associated with the respective NSQs, and the processing circuitry distributes the WRs among the NSQs based on the identifiers. The network adapter may retrieve from the MCSQ a WR to which no NSQ has yet been assigned. In this case, the processing circuitry selects an available NSQ among the multiple NSQs, associates the identifier with the available NSQ, and posts the WR on the available NSQ. In response to detecting that the identifier in a given WR is already associated with a selected NSQ, the processing circuitry posts the WR on the selected NSQ. In some embodiments, the association between WRs and NSQs is based on target address and network state.

In the disclosed embodiments, some transport contexts may use the RC protocol, while others may use the DC protocol or the User Datagram Protocol (UDP). Association of a WR with a NSQ may be carried out by selecting a specific type of a transport context. Alternatively, the network adapter may select the best available type of a transport context at execution time.

In an embodiment, the host posts WRs on first and second MCSQs associated respectively with first and second NSQ pools. In this embodiment the processing circuitry distributes WRs from the first MCSQ to NSQs in the first pool and distributes WRs from the second MCSQ to NSQs of the second pool. The NSQ pools may be disjoint, or alternatively, at least one NSQ is shared among the first and second NSQ pools. In this case, the processing circuitry posts WRs from both the first and the second MCSQs to the at least one NSQ.

It is noted that the MCSQ may be viewed as a front end of a set of queues on the host side, while the NSQs are the back end of the set of queues on the network side. In some embodiments, the software on the host is not aware of the existence of the back end of the set of queues, and relates to the MCSQ as if it is a prior art SQ. In other embodiments, however, the host software is aware of the separation between the MCSQ and the NSQs and the WRs placed in the MCSQ are different from what would be placed in prior art SQs. For example, in some embodiments, the WRs placed in the MCSQ include a channel ID or network destination indicator and the network adapter places the WRs in the NSQs in a manner that ensures that WRs having the same stream ID are placed in the same NSQ.

The network adapter executes WRs posted to the same NSQ in the posting order, but typically does not guarantee execution order of WRs posted on different NSQs to match the same order in which the WRs were posted to the MCSQ.

To execute WRs in the same order they were posted on the MCSQ, these WRs are optionally posted on the same NSQ. Alternatively, as discussed below, the WRs of a single stream are placed on multiple NSQs in a manner which coordinates their handling and assures that they are handled in order.

To post CQEs in the same order in which the corresponding WRs were posted on the MCSQ, the processing circuitry posts on the CQ a CQE corresponding to a given WR, after posting on the CQ all CQEs corresponding to WRs posted to the MCSQ before the given WR. Alternatively, in case out of order execution is allowed, the processing circuitry posts CQEs on the CQ independently of an order of respective WRs in the MCSQ.

In some embodiments, between connection establishment and termination, a DC NSQ serves WRs specifying a common target. In such embodiments, the processing circuitry distributes to a given NSQ that has established a connection with a RQ of a given target, only WRs specifying the given target, until the connection terminates.

A connection using a NSQ may fail for various reasons such as transport retry count exceeded, Retry Receiver Not Ready (RNR) Negative Acknowledgement (NACK) retry count exceeded, remote access error and remote operation error.

When a connection fails, the network adapter cannot execute WRs posted on the corresponding NSQ and therefore does not post corresponding CQEs on the CQ. Therefore, the host software may not know of the failure and may continue to submit WRs directed to the failed NSQ to the MCSQ. As the failed NSQ cannot receive these work requests, the MCSQ may be filled with WRs of the failed NSQ. This, in turn, may cause suspension of retrieving from the MCSQ WRs destined to other connections using other NSQs. In some embodiments, in response to detecting a failure in a given NSQ, the processing circuitry posts on a CQ, a CQE indicative of the failure. For example, the processing circuitry is configured to post on the CQ a CQE indicative of the failure for each WR that is to be executed in the given NSQ. Thus, the network adapter suspends execution of WRs associated with the failing connection but keeps executing WRs of active connections.

Optionally, the host software identifies the CQEs of the failing connection and acts accordingly, e.g., by removing the corresponding WRs from the MCSQ. For example, the host software may overwrite the WRs of the failed NSQ with no-operation (NOP) WRs and/or with newer work requests of other NSQs which did not fail. Alternatively, the host software does not remove WRs of a failing connection, but refrains from placing additional WRs of the failed channel on the MCSQ.

In some embodiments, a plurality of NSQs are grouped together to form a single stream. The distribution of the WRs from the MCSQ to the NSQs of the stream, in these embodiments, is such that the order of packets in the stream is conserved. In these embodiments, when a connection of one of the NSQs fails, all the NSQs belonging to the stream of the failed NSQ are stopped. Accordingly, the removal of WRs from the MCSQ or the refraining of placing additional WRs is performed for all the NSQs of the stream.

In some embodiments, the host CPU or the NIC attempts correcting the error and restoring connectivity, e.g., by restarting the physical connection or applying other suitable corrective actions. The attempts to correct the error are optionally performed only after verifying that error CQEs were sent for all the outstanding WRs of the NSQs of the stream. This is intended to avoid a situation in which WRs of the stream placed in the MCSQ before the restart are placed on the NSQ after the restart. After the error has been corrected, the host CPU drains the remaining WRs, and reposts them starting from the last WR that was executed successfully.

In the disclosed techniques, a network adapter offloads the management of multi-channel connections from the host. The host thus posts WRs specifying multiple different targets possibly using different transport services on a common MCSQ. The network adapter distributes the WRs among multiple SQs that are connected to the targets and posts completion notifications on a common completion queue, without involving the host CPU. Using this scheme, CPU cycles that would otherwise be used for communication management are freed, e.g., for computation tasks. By using a common multi-channel queue (the MCSQ work queue), storage space is reduced significantly, compared to using individual work queues. Moreover, the disclosed embodiments, improve CPU cache performance.

System Description

FIG. 1 is a block diagram that schematically illustrates a computing system 20, in which a network adapter manages for a host communication over multiple channels, in accordance with an embodiment that is described herein.

In computing system 20, a network node 24 communicates with remote network nodes 28 over a communication network 30. Communication network 30 may comprise any suitable packet network such as, for example, an Ethernet network or the InfiniBand™ (IB) fabric.

Computing system 20 may be used, for example, in applications in which a network node exchanges large amounts of data with other network nodes, such as, for example, High-Performance Computing (HPC), distributed computing and data centers, to name a few.

Network node 24 comprises a processor, in the form of a Central Processing Unit (CPU) 32, and a memory 34, which are interconnected by a suitable bus 36. In the present example bus 36 comprises a Peripheral Component Interconnect Express (PCIe) bus. Alternatively, other suitable bus types can also be used. Network node 24 further comprises a network adapter 38 for connecting to communication network 30, such as a Network Interface Controller (NIC). The combination of CPU 32, memory 34 and bus 36 (with or without the network adapter) is also referred to as a "host computer" or simply "host", for brevity.

Network adapter 38 comprises a network interface 42, which is coupled to communication network 30, and a host interface 44, coupled via bus 36 to CPU 32 and memory 34. Processing circuitry 46, coupled between network interface 42 and host interface 44, generates outgoing packets for transmission over communication network 30 and processes incoming packets received from the communication network, as will be described below.

In the ingress direction, processing circuitry 46 applies to packets received in the network adapter via network interface 42, various processing such as verifying the correctness of the data in the packet payload, packet classification and prioritization, and routing. The processing circuitry 46 typically checks certain fields in the packets' headers for the purpose of packet classification and routing. The header fields contain addressing information, such as source and destination addresses and port numbers, and the underlying network protocol used. In the egress direction, processing circuitry 46 retrieves data for transmission from the host, via host interface 44, packetizes the data into a sequence of packets, and transmits the packets to their destinations over communication network 30.

In the disclosed embodiments, processing circuitry 46 communicates over communication network 30 using work queues 48. The description that follows mainly refers to work queues 48 as Network Send Queues (NSQs) serving for data transmission. Alternatively, e.g., in IB networks, a work queue 48 comprises a Queue-Pair (QP) comprising a Network Send Queue (NSQ) and a Receive Queue (RQ) (not shown). The NSQ, or the NSQ part of a QP stores Work Requests (WRs) specifying data transmission operations, whereas the RQ part of the QP stores WRs specifying data reception operations. Some WRs may comprise control WRs, e.g., for establishing or terminating a connection. The WRs stored in the work queues are executed by processing circuitry 46.

In using QP terminology, posting a WR specifying a data transmission operation on a QP means that the WR will be posted on the NSQ part of that QP.

A WR of a data transfer operation may specify, for example, a buffer 52 in memory 34 serving as a source buffer or destination buffer, and the amount of data to be transferred. In an embodiment, the data transfer operation may comprise a Remote Direct Memory Access (RDMA) operation that accesses memory 34 directly without involving CPU 32.

The description that follows focuses mainly on the egress direction in which the host transmits data to a target, e.g., via the network adapter. In the egress direction the data to be transmitted may reside in a buffer 52.

In some embodiments, to transmit data, processing circuitry 46 retrieves a WR from the relevant NSQ and executes the data transmission operation specified in the WR. The processing circuitry 46 transmits the data in one or more packets, wherein the target recipient acknowledges each packet by sending back to the network adapter an Ack notification. When the data transmission completes (e.g., when the network adapter receives an Ack for the last packet), the processing circuitry 46 posts a Completion Queue Element (CQE) on a Completion Queue (CQ) 58 in memory 34. The CQE notifies the host of completing the execution of the corresponding WR. In some embodiments, a single CQE may be indicative of execution completion of one or more WRs.

A Multi-Channel Send Queue (MCSQ) 56 receives WRs from multiple processes 50. The WRs are to be retrieved and executed by network adapter 38 as will be described below. Although FIG. 1 depicts a single MCSQ, in alternative embodiments, multiple MCSQs can also be used. For example, in some embodiments, a separate MCSQ is assigned to each process 50. Alternatively or additionally, separate MCSQs are assigned to different types of connections, for example to any combination of the types: reliable connections (RCs), extended reliable connections (XRCs), dynamically connected connections (DCs) and scalable reliable connections (SRCs). Further alternatively or additionally, different MCSQs are assigned to services of different service level agreements (SLAs), such as latency levels, bandwidth levels and/or priority levels. In some embodiments, separate MCSQs are assigned to connections with different traffic patterns.

In the present example, NSQs 48, MCSQs 56 and CQs 58 reside in memory 34 of host 24. This, however, is not mandatory. In alternative embodiments, one or more of NSQs 48, one or more of MCSQs 56 and/or one or more of CQs 58 may reside in another memory such as a memory (not shown) of network adapter 38.

Client processes 50, (also referred to simply as "clients" for brevity) running on CPU 32, such as processes generated by application software, communicate with peer clients (not shown) running on remote network nodes 28. Client processes 50 may be of any suitable type of work initiator, including processes, threads, warps and blocks.

In some embodiments, one or more MCSQs 56 serve as communication interfaces for clients 50. Clients 50 may post on a given MCSQ WRs corresponding to multiple different targets, wherein each WR is to be posted on a NSQ 48 that connects to the respective target. As will be described in detail below, the processing circuitry 46 retrieves WRs from the MCSQ and distributes the WRs among NSQs associated with that MCSQ. The processing circuitry 46 also handles posting CQEs on CQs 58. The host software that interfaces multi-channel communication via a single MCSQ and a common CQ is much more efficient and requires less CPU cycles than in managing by the host multiple NSQs and CQs directly.

In some embodiments, CPU 32 comprises a cache memory 60, which typically serves for temporarily storing data required by the CPU. Processing data in the local cache is typically much faster than processing data residing in memory 34. In an embodiment, the cache stores one or more MCSQs, or respective parts of such MCSQs.

In some embodiments, network node 24 comprises a coprocessor such as an accelerator 64. The accelerator may comprise a hardware device implemented, e.g., in a Field-Programmable Gate Array. The accelerator may be used for fast execution of various data processing tasks, on behalf of the CPU, such as data compression/de-compression, data encryption/decryption and the like. In some embodiments, a client 50 communicates with accelerator 64 by posting a WR on MCSQ 56, wherein the WR specifies the accelerator as the target.

In some embodiments, to establish a connection between a client process running on a host and a peer process running on a target, the host sends a connect packet to the target. After the connection has been established, a NSQ (48) and a RQ are assigned at the initiator host side and peer RQ and NSQ are assigned at the target side. To disconnect a connection, the initiator host sends a disconnect packet to the target.

In some embodiments, NSQs 48 may be configured to operate in accordance with a Reliable Connection (RC) protocol or in accordance with a Dynamically Connected (DC) protocol.

In the RC transport service, the connection between the host and the target is persistent, i.e., intended to remain active for a relatively long time. A connection in accordance with the RC protocol is available for communication at any time, and therefore can be used immediately (or with only sort delay) when needed. Since in the RC protocol the connection remains available even when no traffic is exchanged, the RC persistently consumes storage space for the SQs and RQs at both sides. The RC is therefore not well scalable for supporting a large number of simultaneous connections.

In the DC transport service, connections between the host and targets are established on demand. The host (or its network adapter) may hold a pool of NSQs that is typically much smaller than a NSQ pool of a RC transport service. When the host transmits data to a given target, a NSQ is temporarily assigned to connect to this target. When the transfer operation completes, the connection is terminated and the NSQ becomes available in the pool for connecting to other targets. The DC transport service is scalable because it uses a relatively small number of shared NSQs. A disadvantage of the DC transport service is the latency incurred for connection establishment and termination.

In the disclosed embodiments, a single consumer work queue (e.g., a MCSQ) serves a large number of RC and DC NSQs. The NSQs consume much less storage space compared to the MCSQ because they need only a small storage space for the transport context and a small amount of storage space for storing information used for accessing WRs in the MCSQ. Such a configuration is especially beneficial when memory and/or cache storage space available for the WR initiator are limited. Interfacing a single MCSQ instead of interfacing many NSQs is also advantageous in general, and for WR initiators having limited resources. Examples of WR initiators having limited resources include peer hardware devices (e.g., a FPGA device or GPU), SoC, embedded CPU and the like.

Multi-Channel Management by Network Adapter

Figure 2:
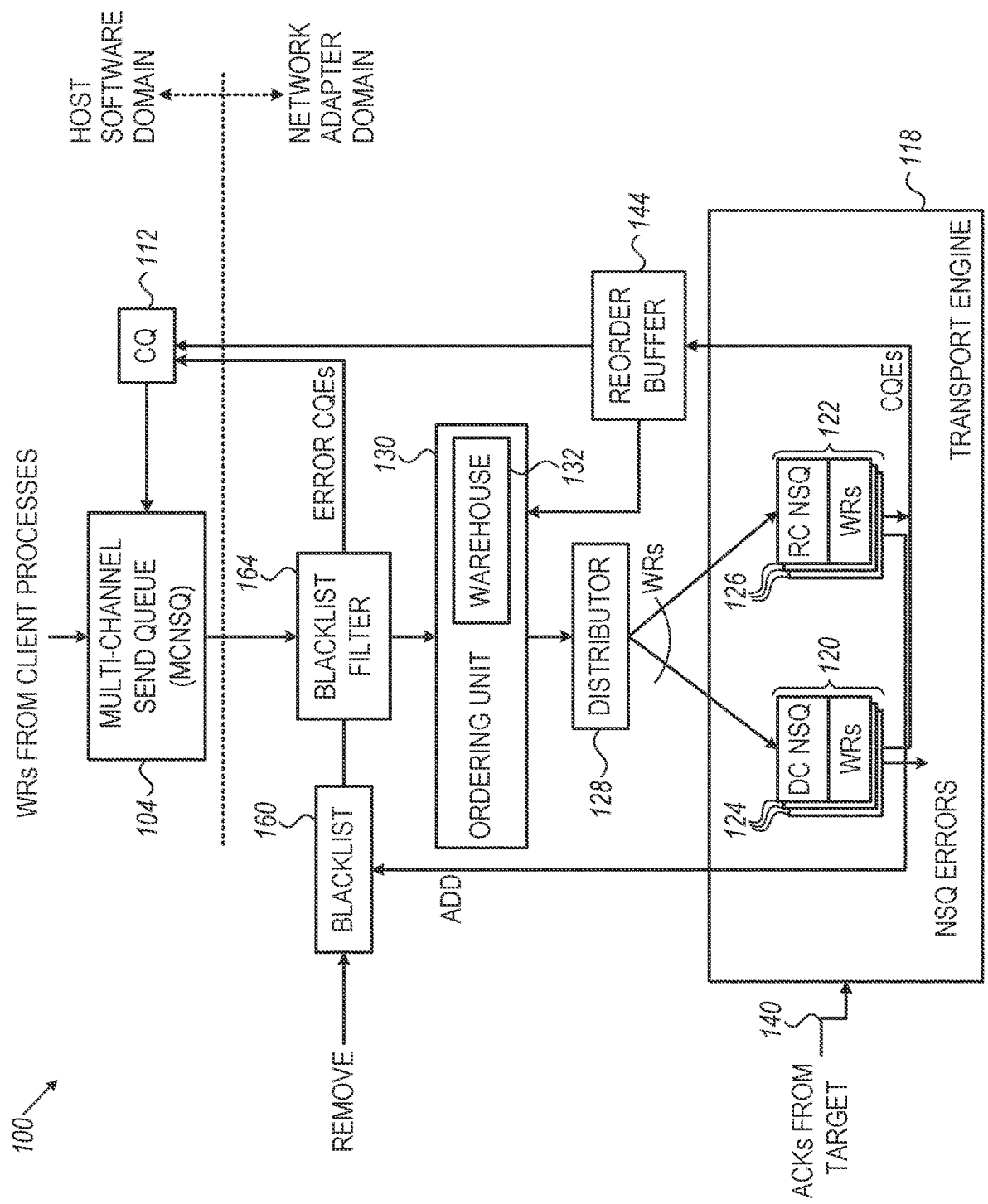
FIG. 2 is a diagram that schematically illustrates data flow in a network node that supports communication over multiple channels, in accordance with an embodiment that is described herein.

FIG. 2 is a diagram that schematically illustrates data flow in a network node 100 that supports communication over multiple channels, in accordance with an embodiment that is described herein.

The data flow within network node 100 will be described with reference to network node 24 of FIG. 1.

In network node 100, multi-channel communication is carried out by combination of software executed by CPU 32 of the host and management of multiple connections by network adapter 38. In FIG. 2, a horizontal dotted line separates between the host software domain and the network adapter domain. In the present context, the software domain and network adapter domain refer to respective processing carried out by CPU 32 and by network adapter 38, respectively. The data structures involved in the processing, such as MCSQs, NSQs and CQs, may reside in any suitable memory such as memory 34 or a memory of the network adapter (not shown).

In the example of FIG. 2, elements of the software domain (above the dotted line) comprise a MCSQ 104 for interfacing WRs to the network adapter. Although FIG. 2 depicts a single MCSQ, in alternative embodiments, any other suitable number of MCSQs may be used.

MCSQ 104 receives from clients 50 running on the host WRs specifying data transmission operations. A WR specifying data transmission contains an identifier indicative of a NSQ on which to post the WR.

In the RC protocol, a single NSQ is used for connecting to a single target, in which case the number assigned to the NSQ (e.g., or QP number) can be used as the NSQ identifier for that target. In the DC protocol, the same DC NSQ is used for connecting to different targets at different times. In this case, the CPU assigns a stream identifier (stream ID) to each WR, which is then posted on a DC NSQ serving the relevant stream ID. When no NSQ is assigned to the stream ID of the WR, an available DC NSQ (if there is one) will be assigned to that stream ID, and the WR will be posted on that DC NSQ. If no DC NSQ is available for posting the WR, the distributor waits until one of the used DC NSQs becomes available. A WR specifying data transmission to a given target will be posted on a DC NSQ that serves the relevant stream ID. If this DC NSQ is currently serving another target, after serving all of its previously posted WRs, the DC NSQ reconnects for serving the given target.

Note that in terms of targets, each of the DC NSQs can connect to any desired target. In terms of stream IDs—if there is a DC NSQ serving a stream ID, the WR having this stream ID is posted on this DC NSQ to guarantee the execution order of different WRs associated with the same stream ID. This applies for WRs destined to the same or different targets.

A common CQ 112 receives from the network adapter CQEs indicative of execution completion of WRs posted on MCSQ 104.

A given client 50 may communicate with multiple targets. The clients typically post WRs on the MCSQ in some desired order. For example, a client may post one or more WRs for sending data to a target, before posting one or more additional WRs for sending data to the same or to another target.

Network node 100 comprises a transport engine 118. In the present example, the transport engine comprises a DC NSQ pool 120 of DC NSQs 124 operating in DC mode, and a RC NSQ pool 122 comprising RC NSQs 126 operating in RC mode.

A distributor 128 retrieves WRs from MCSQ 104 and posts them on DC NSQs 124 and RC NSQs 126 as appropriate. In some embodiments, each WR in the MCSQ comprises an identifier indicative of the DC NSQ or the RC NSQ on which to post that WR. A given DC NSQ may serve connections with same or different targets of a common stream ID, at different times. A given RC is typically associated with a given NSQ identifier, for example, by a QP number. In some embodiments, some or all of the work requests (WRs) have two identifiers, one identifier which identifies a stream and one which identifies a channel.

In some embodiments, for DC NSQs, the distributor holds a mapping table between stream IDs and respective active DC NSQs. When a DC NSQ completes executing all of its pending WRs, the distributor releases the association between the DC NSQ and the stream ID.

In some embodiments, distributor 128 posts WRs of targets of a common stream ID on a same DC NSQ. Similarly, distributor 128 may post WRs of targets of a common identifier (QP number) on a same RC NSQ. This guaranties that WRs having the same identifier will be executed sequentially in the same order they were posted on the MCSQ.

Transport engine 118 reads WRs from DC NSQs 124 and from RC NSQs 126 and executes them. In some embodiments, the transport engine executes one WR at a time. In such embodiments, the transport engine selects a DC NSQ or a RC NSQ from which to execute a WR using any suitable method, e.g., a round robin method or randomly. Alternatively, the transport engine supports executing multiple WRs from multiple NSQs in parallel. For example, the transport engine may execute a WR from a DC NSQ and a WR from a RC NSQ in parallel, and/or execute multiple WRs from multiple DC NSQs and/or from multiple RC NSQs in parallel.

In executing a WR, transport engine 118 reads data to be transmitted, e.g., from a buffer 52 in memory 34, packetizes the read data into a sequence of packets, and transmits the packets to the relevant target, e.g., over communication network 30. For each packet sent, the transport engine receives an Ack notification 140 from the target. After receiving the Ack for the last packet corresponding to the current WR, the transport engine generates a CQE indicative of the WR execution completion. The transport engine posts the CQE on common CQ 112 (for both DC NSQs and RC NSQs), which common CQ is accessible by the host.

The transport engine executes WRs posted on a DC NSQ (or on a RC NSQ) in the same order they were posted on the relevant MCSQ, but typically executes WRs posted on different DC NSQs (or on different RC NSQs) in an order different from their order in the MCSQ. Such an out of order execution may occur for various reasons, such as WRs requiring different execution times, NSQs experiencing different workloads and different priorities assigned to different NSQs.

In some embodiments, the transport engine supports ordered or unordered posting of CQEs on the common CQ.

As noted above, the execution order of the WRs typically differs from the order in which the WRs were posted on the MCSQ. In the ordered mode, the CQEs are first placed in internal CQs or in a reorder buffer 144 and later the CQEs are posted to the common CQ, in the same order in which the corresponding WRs were posted on the MCSQ. In the ordered mode, the network adapter posts a CQE corresponding to a given WR in the common CQ, only after WRs posted in the MCSQ before the given WR have been executed and their CQEs have been posted in the common CQ. In an example embodiment, CQE reordering may be based on sequence numbers assigned to the WRs posted on the MCSQ. In some embodiments, in the ordered mode, when transferring the CQEs from reorder buffer 144 to the common CQ, processing circuitry 46 may combine a plurality of CQEs directed to a single client 50, into a single CQE which corresponds to multiple WRs. This reduces the number of CQEs handled by the host. Consider, for example, posting on the MCSQ three WRs, one WR for each of three connections. In the ordered mode, the network adapter can post a CQE only for the last WR executed among the three posted on the MCSQ.

In the unordered mode, transport engine 118 posts CQEs in the order of WRs completions, which is typically different from the order in which the WRs were posted on the MCSQ. The unordered mode may be used, for example, when the host (e.g., a client 50) does not expect any specific execution order among the WRs. As such, the host may handle a completed WR, without having to wait for previous slower WRs to complete execution.

In DC NSQ pool 120, at any given time each of DC NSQs 124 may be engaged in a connection or be available for establishing a new connection.

The transport engine may disconnect an engaged DC NSQ for which no WRs were submitted for a predefined time, and the disconnected DC NSQ becomes available for other connections.

In RC NSQ pool 122, a RC NSQ 126 is connected to a respective target for a long period of time even when the RC NSQ has no WRs submitted for execution.

In some embodiments, distributor 128 includes or is associated with an ordering unit 130, which assures that WRs of a same stream, belonging to different channels, for example channels directed to different destinations, are handled according to their order in the MSCQ. In one of these embodiments, all the WRs of the same stream are placed on a same NSQ. The NSQ checks for each WR the channel to which the WR belongs and when the channel of a current WR is different from the channel of the previous WR handled, the NSQ performs a context switch to the channel of the current WR.

In others of these embodiments, the WRs of different channels are placed on different respective NSQs, and ordering unit 130 times the placement of the WRs on the NSQs in a manner which ensures they are handled in their order in the stream. Optionally, ordering unit 130 includes a warehouse 132 in which the WRs are stored temporarily until they can be placed in their respective NSQ. When a current WR of a stream take from the MCSQ belongs to a different channel than a previous WR, the current WR is stored temporarily in the warehouse 132 until a CQE is received for the previous WR. In still other embodiments, rather than using warehouse 132, ordering unit 130 places the WRs on their respective NSQs, but stops the NSQ of the later WRs until the CQE indicating the handling of the previous WRs are received. Optionally, distributor 128 adds to the NSQs which are to stop, fending markers which indicate a WR of another channel which is to be completed before further WRs in the NSQ can be handled.

It is noted that in some embodiments warehouse 132 is used for additional tasks. For example, warehouse 132 is used in some embodiments to temporarily store WRs which need to be placed on an unused NSQ, when there are no available unused NSQs.

Alternatively to using warehouse 132, the WRS which require temporary storage may be left in MCSQ 104, with a marking that they are out of order and require transfer to an NSQ.

The multi-channel communication in network node 100 may fail when MCSQ 56 malfunctions, e.g., due to a failure in transferring WRs into or out of the MCSQ. In this case, all multi-channel communication via the failing MCSQ is suspended, in an embodiment.

Multi-channel communication may also fail when a DC NSQ or a RC NSQ fails, e.g., due to a connection timeout. In this case, in an embodiment, only the failing DC NSQ or RC NSQ is suspended, while communication via other DC NSQs and RC NSQs continues uninterrupted.

Note that WRs in a failing NSQ are not executed and therefore the transport engine does not generate CQEs for these WRs. This may block execution of WRs in the MCSQ associated with valid connections. In some embodiments, to allow fluent operation of the MCSQ, the network adapter generates CQEs indicative of the failure, and posts them on the CQ. The client 50 may respond to such CQEs as if the corresponding WRs have been completed.

In an embodiment, the network adapter generates for WRs destined to the failing RC NSQ or DC NSQ, CQEs indicative of a failing connection, and posts these CQEs on the CQ.

When a RC or DC NSQ fails, the stream identifier that is currently associated with the failing NSQ is added to a blacklist 160. The NSQ identifier may comprise a QP number for RC or a stream ID for DC. In case of a TCP connection, the NSQ identifier may comprise a five-tuple comprising source and destination addresses, source and destination port numbers and an underlying protocol. When distributor 128 reads a WR from MCSQ 104, a blacklist filter 164 checks whether the identifier of the NSQ is in blacklist 160. When the identifier is not in the blacklist, the distributer sends the WR to the relevant NSQ, as described above. When the identifier is in the blacklist, the blacklist filter refrains from sending the WR to the distributor 128. Instead, the network adapter generates a CQE indicative of the failing connection and posts the CQE on common CQ 112. At a suitable later time, e.g., when the failure is fixed, the host sends to the network adapter a command to remove the NSQ identifier from the blacklist.

In the example embodiment of FIG. 2, transport engine 118 executes the WRs in the NSQs. For example, the transport engine comprises a single execution engine that executes all the WRs. Alternatively, transport engine comprises multiple execution engines that are dynamically allocated for executing the WRs.

As noted above, the number of MCSQs is not necessarily limited to a single MCSQ. When having multiple MCSQs, a NSQ connected to a given target may serve multiple MCSQs.

The computing system (20), network node (24) and network adapter (38) configurations shown in FIG. 1 are example configurations, which are chosen purely for the sake of conceptual clarity. In alternative embodiments, any other suitable computing system, network node and network adapter configurations can also be used. Elements that are not necessary for understanding the principles of the present invention, such as various interfaces, addressing circuits, timing and sequencing circuits and debugging circuits, have been omitted from the figure for clarity.

Some elements of network adapter 38, such as processing circuitry 46, may be implemented in hardware, e.g., in one or more Application-Specific Integrated Circuits (ASICs) or FPGAs. Additionally or alternatively, processing circuitry 46 can be implemented using software, or using a combination of hardware and software elements. Memory 34 may comprise any suitable type of memory using any suitable storage technology such as a Random Access Memory (RAM), a Dynamic RAM (DRAM), a nonvolatile memory such as a Flash memory, or a combination of multiple memory types.

In some embodiments, some of the functions of network adapter 38, e.g., function of processing circuitry 46, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Methods for Multi-Channel Communication Using DC and RC Protocols

Figure 3:
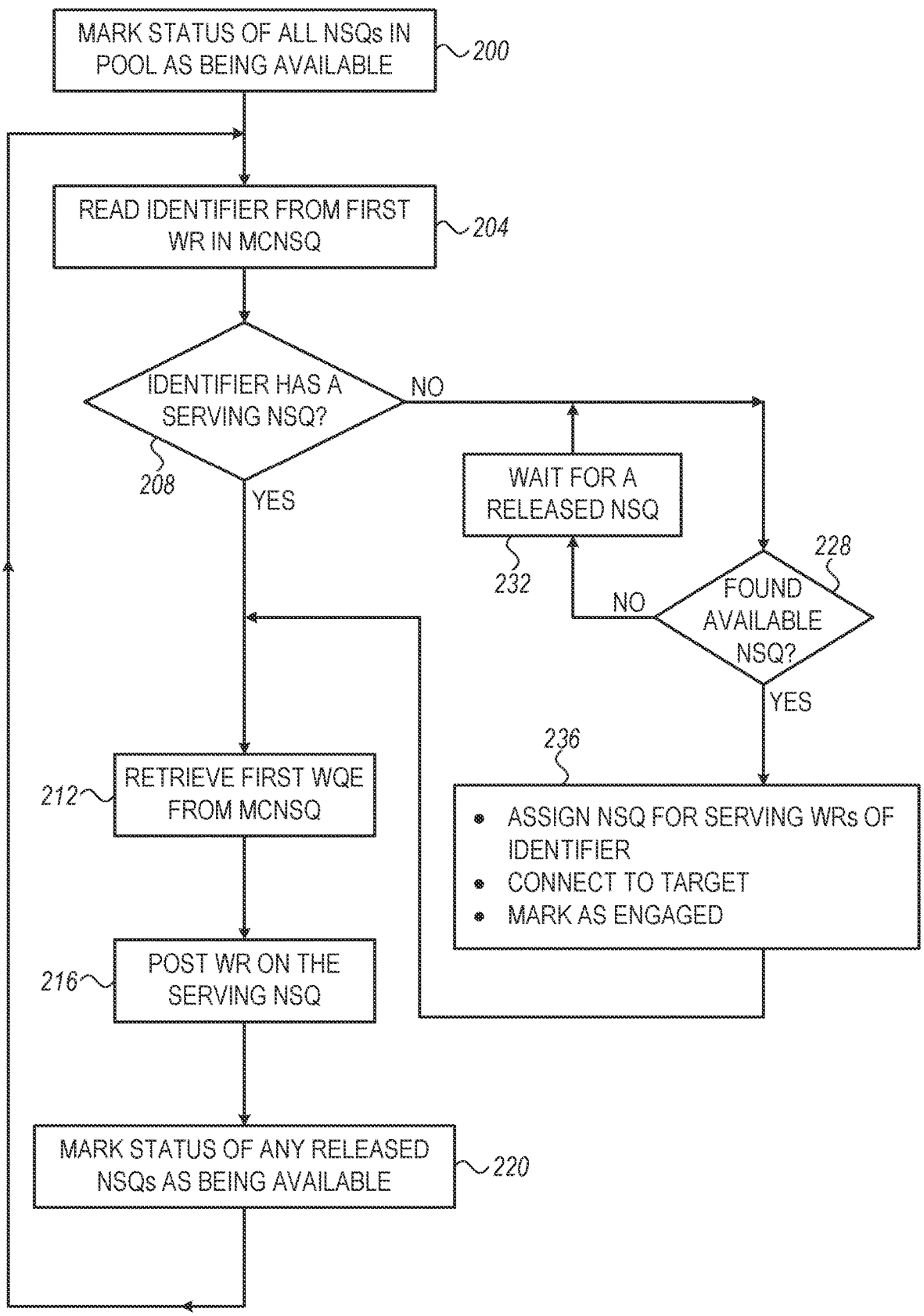
FIG. 3 is a flow chart that schematically illustrates a method for multi-channel transmission, in accordance with an embodiment that is described herein.

FIG. 3 is a flow chart that schematically illustrates a method for multi-channel transmission, in accordance with an embodiment that is described herein.

The method will be described as executed by network adapter 38 of FIG. 1 (more specifically by processing circuitry 46 of the network adapter), and with reference to the diagram in FIG. 2 including elements of the network adapter domain.

In describing the method of FIG. 3, it is assumed that the WR includes an identifier field indicative of a NSQ on which the WR is to be posted.

The method begins with network adapter 38 marking a status of all DC NSQs 124 in DC NSQ pool 120 and of all RC NSQs 126 in RC NSQ pool 122 as being available, at a NSQ initialization step 200. At an identifier determination step 204, the network adapter reads an identifier field from the first WR (e.g., the WR at the head position) in MCSQ 104. The identifier depends on the underlying protocol. For example, when the WR specifies transmission using the DC protocol, the identifier may comprise a stream identifier. Alternatively, when the WR specifies transmission using RC mode, the identifier may comprise a QP number. Further alternatively, when the underlying protocol is the TCP, the identifier may comprise a five-tuple comprising source and destination addresses, source and destination port numbers and an underlying protocol.

At an association query step 208, the network adapter checks whether the identifier has been associated with any of DC NSQs 124 or RC NSQs 126, and if so, retrieves the first WR from the MCSQ, at a WR retrieval step 212. At a WR posting step 216, the network adapter posts the WR on the serving NSQ determined at step 208 above. At a released checking step 220, the network adapter checks whether any NSQ has been released, and if so, marks the status of the released NSQs as being available. Following step 220 the network adapter loops back to step 204 to process a subsequent WR in MCSQ 104.

When at step 208, the identifier has no associated NSQ in the DC NSQ pool or in the RC NSQ pool, the network adapter proceeds to a NSQ availability checking step 228, to check for an available DC NSQ in the DC NSQ pool or a RC NSQ in the RC NSQ pool, as required. When at step 228 no available NSQ is found, all the NSQs in the relevant pool are engaged with connections, and the network adapter proceeds to a waiting step 232, to wait for one (or more) of the DC NSQs in the DC NSQ pool or one (or more) of the RC NSQs in the RC NSQ pool to disconnect and become available, and loops back to step 228.

When at step 228 an available NSQ is found, the network adapter proceeds to an assignment step 236, to assign the found NSQ to serve WRs having the identifier of step 204. Further at step 236, the network adapter establishes a connection between the found NSQ and a SQ of the target and marks the status of the found NSQ as engaged. Following step 236, the network adapter proceeds to step 212 followed by step 216, to retrieve the current first WR and post it on the NSQ assigned at step 236.

Figure 4:
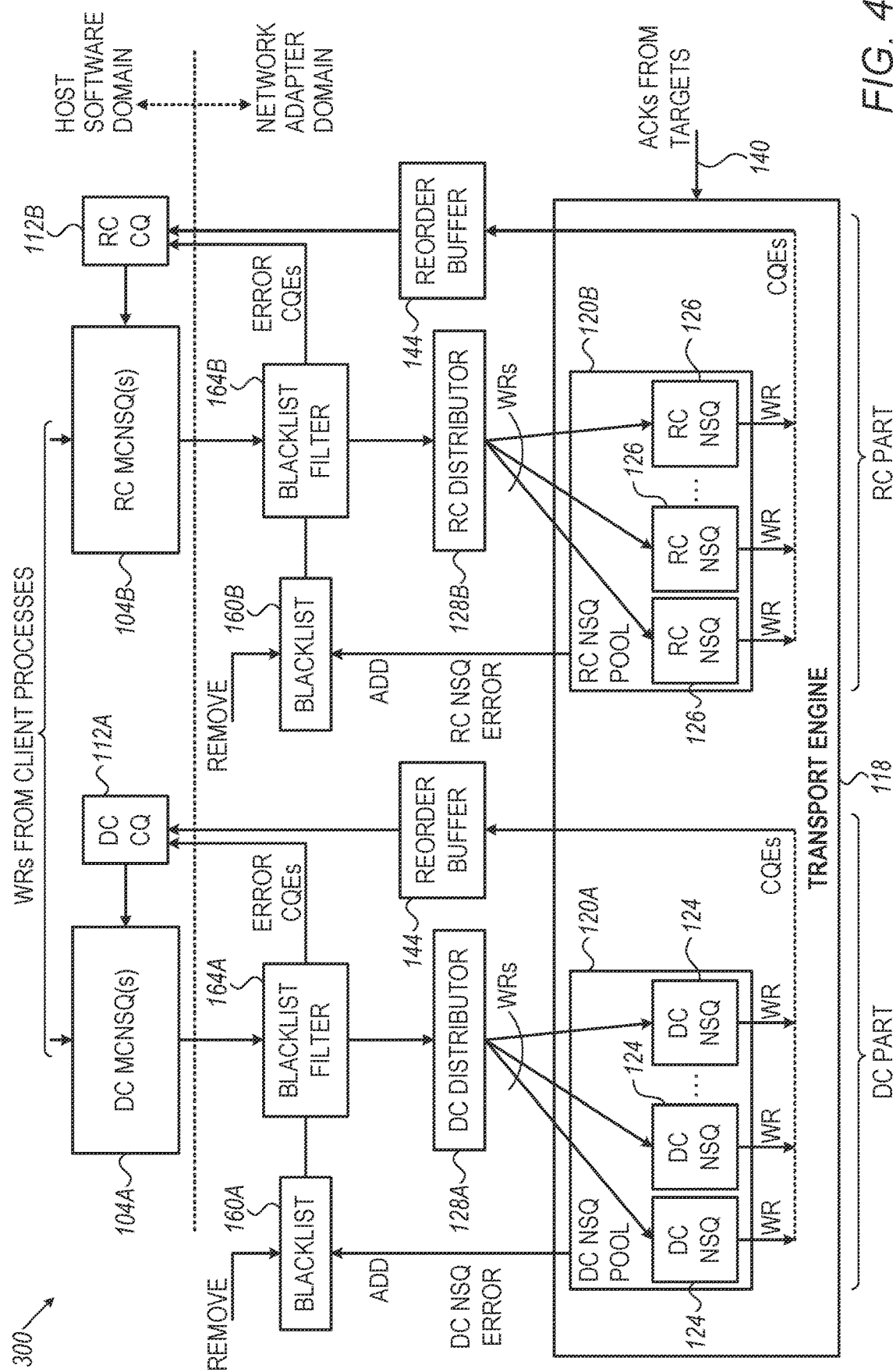
FIG. 4 is a diagram that schematically illustrates data flow in a network node that separately manages communication using DC and RC connections, in accordance with an embodiment that is described herein.

FIG. 4 is a diagram that schematically illustrates data flow in a network node 300 that separately manages communication over DC and RC connections, in accordance with an embodiment that is described herein.

In FIG. 4 WRs for RC and DC are handled separately. The DC part comprises a DC MCSQ 104A (or multiple DC MCSQs), holding WRs that a DC distributor 128A distributes among DC NSQs 124. Completion of DC WRs are reported via a DC CQ 112A. The RC part comprises a RC MCSQ 104B (or multiple RC MCSQs), holding WRs that a RC distributor 128B distributes among RC NSQs 126. Completion of RC WRs are reported via a RC CQ 112B. The DC and RC parts comprise separate blacklists 160A and 160B and separate blacklist filters 164A and 164B for handling DC NSQ failures and RC NSQ failures, respectively. Each of the DC part and the RC part comprises a reorder buffer 144 for reordering completion reports.

The data flow in the DC and RC parts using separate MCSQs, is similar to the functionality and data flow described above in FIG. 2 above, in which DC and RC are handled using a common MCSQ.

In some embodiments, the host posts WRs on a first and second MCSQs associated respectively with first and second pools of NSQs. Each of the first and second MCSQs may be DC MCSQ or a RC MCSQs. In such embodiments, the network adapter distributes WRs from the first MCSQ to NSQs in the first pool and distributes WRs from the second MCSQ to NSQs of the second pool. In some embodiments, at least one NSQ is shared among the first and second pools (e.g., both are DC NSQ pools or both are RC NSQ pools), and the network adapter posts WRs from both the first and the second MCSQs to the at least one NSQ.

The embodiments described above are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
   a network interface, configured to connect to a communication network for communicating with remote targets;
   a host interface configured to connect to a host that accesses a Multi-Channel Send Queue (MCSQ) storing Work Requests (WRs) originating from client processes running on the host; and
   processing circuitry, configured to:
   retrieve WRs from the MCSQ and distribute the retrieved WRs among multiple Network Send Queues (NSQs) accessible by the processing circuitry, and
   retrieve WRs from the multiple NSQs and execute data transmission operations specified in the WRs retrieved from the multiple NSQs.

2. The network adapter according to claim 1, wherein each of the targets comprises (i) a remote node coupled to the communication network or (ii) a local device coupled to the host.

3. The network adapter according to claim 1, wherein the WRs comprise respective identifiers associated with respective NSQs, and wherein the processing circuitry is configured to distribute the WRs among the NSQs based on the identifiers.

4. The network adapter according to claim 3, wherein the processing circuitry is configured to, in response to detecting that the identifier in a retrieved WR has no associated NSQ among the NSQs, select an available NSQ among the multiple NSQs, to associate the identifier with the available NSQ, and to post the WR on the available NSQ.

5. The network adapter according to claim 3, wherein the processing circuitry is configured to, in response to detecting that the identifier in a given WR is associated with a selected NSQ, post the WR on the selected NSQ.

6. The network adapter according to claim 1, wherein the processing circuitry is configured to operate the NSQs in accordance with a Reliable-Connection (RC) protocol in which the NSQs are assigned to connect persistently to respective targets.

7. The network adapter according to claim 1, wherein the processing circuitry is configured to operate the NSQs in accordance with a Dynamically Connected (DC) protocol, which allows a given NSQ to connect to different targets at different times.

8. The network adapter according to claim 1, wherein the host posts WRs on first and second MCSQs associated respectively with first and second pools of NSQs, and wherein the processing circuitry is configured to distribute WRs from the first MCSQ to NSQs in the first pool, and to distribute WRs from the second MCSQ to NSQs of the second pool.

9. The network adapter according to claim 8, wherein at least one NSQ is shared among the first and second pools, and wherein the processing circuitry is configured to post WRs from both the first and the second MCSQs to the at least one NSQ.

10. The network adapter according to claim 1, wherein the processing circuitry is configured to post on a Completion Queue (CQ) accessible by the client processes a Completion Queue Element (CQE) indicative of concluding execution of a given WR, after posting on the CQ all CQEs corresponding to WRs posted to the MCSQ before the given WR.

11. The network adapter according to claim 1, wherein the processing circuitry is further configured to post a Completion Queue Element (CQE) to a reorder buffer upon concluding execution of each WR, and to move at least some of the CQEs to a Completion Queue (CQ) accessible by the client processes, in an order in which the corresponding WRs were posted to the MCSQ.

12. The network adapter according to claim 11, wherein in moving the at least some of the CQEs to the CQ accessible by the client processes, the processing circuitry combines a plurality of CQEs into a single CQE.

13. The network adapter according to claim 1, wherein the processing circuitry is configured to post COEs to a co independently of an order of respective WRs in the MCSQ.

14. The network adapter according to claim 1, wherein the processing circuitry is configured to distribute to a given NSQ that has established a connection with a given target, only WRs specifying the given target, until the connection terminates.

15. The network adapter according to claim 1, wherein the processing circuitry is configured to, in response to detecting a failure in a given NSQ, post on a CQ a CQE indicative of the failure.

16. The network adapter according to claim 15, wherein the processing circuitry is configured to post on the Co a CQE indicative of the failure for each WR that is to be executed in the given NSQ.

17. The network adapter according to claim 15, wherein the processing circuitry is configured to post on the CQ a CQE indicative of the failure for each WR from the MCSQ that is to be distributed to the given NSQ.

18. The network adapter according to claim 1, wherein at least a given WR specifies a respective data transmission operation from the host to a target.

19. The network adapter according to claim 1, wherein a given WR specifies a locally executed operation.

20. The network adapter according to claim 1, wherein the processing circuitry distributes the retrieved WRs among the multiple NSQs by placing pointers to the WRs in the NSQs, without moving the WRs themselves.

21. The network adapter according to claim 1, wherein the processing circuitry retrieves WRs from a plurality of different MCSQs, which each corresponds to a respective pool of NSQs, and distributes the retrieved WRs among the respective pool of NSQs.

22. The network adapter according to claim 21, wherein at least one of the NSQs is shared by a plurality of pools of respective MCSQs.

23. The network adapter according to claim 21, wherein the plurality of different MCSQs include different MCSQs for each client process.

24. The network adapter according to claim 1, wherein at least some of the WRs comprise both stream identifiers and channel identifiers associated with respective NSQs, and wherein the processing circuitry is configured to distribute the WRs of a specific stream among the NSQs based on the channel identifiers, in a manner which preserves the order of the packets in the stream.

25. The network adapter according to claim 1, wherein in distributing WRs of a specific stream among the NSQs, the processing circuitry buffers WRs directed to an NSQ different than an NSQ to which a previous WR of the specific stream was transferred, until feedback is received that the previous WR was handled.

26. A computing system, comprising:
a memory, which stores one or more multi-channel send queues (MCSQs) of work requests (WRs);
a central processing unit (CPU) which places WRs on the one or more MCSQs, wherein each WR includes a respective stream identifier; and
a network adapter, which manages communication over a network in multiple channels, in accordance with WRs from one or more MCSQs, and ensures that WRs having a same stream identifier are transmitted through a same network send queue (NSQ).

27. The computing system according to claim 26, wherein the memory includes one or more completion queues (CQs) and the CPU is configured to receive through the Cos indications of a failed connection, and to refrain from placing WRs for the NSQ of the failed connection in the one or more MCSQs.

28. The computing system according to claim 27, wherein the CPU is configured to verify that failure indications were received for all the WRs placed on the one or more MCSQs with stream identifiers directed to the NSQ of the failed connection, and to restart the NSQ of the failed connection only after the verification.

29. The computing system according to claim 26, wherein the network adapter distributes the WRs from the one or more MCSQs to network send queues (NSQs) responsive to the stream identifiers.

30. A network adapter, comprising:
a network interface, configured to connect to a communication network for remote communicating with targets;
a host interface configured to connect to a host that accesses a Multi-Channel Send Queue (MCSQ) storing Work Requests (WRs) originating from client processes running on the host; and
processing circuitry, configured to:
retrieve WRs from the MCSQ and execute data transmission operations specified in the WRs retrieved;
generate completion queue elements (CQEs) indicating execution of the WRs, in an order in which the WRs are executed, which is different from an order in which the WRs are placed in the MCSQ; and
provide the CQEs to the host, in a completion queue (CQ) accessible by the host through the host interface, in the order in which the WRs are placed in the MCSQ.

31. The network adapter according to claim 30, wherein the processing circuitry places the CQEs in the CQ, in accordance to the location of a corresponding WR in the MCSQ, when they are generated, but updates a producer index of the CQ only when all the locations between a current value of the producer index and an updated value of the producer index have been filled by CQEs.

32. The network adapter according to claim 30, wherein the processing circuitry places the CQEs in a reorder buffer when they are generated and thereafter transfers the CQEs from the reorder buffer to the CQ, in the order in which the WRs are placed in the MCSQ.

\* \* \* \* \*